Nov. 5, 1935.  H. W. NIEMAN  2,019,792
ADJUSTING MECHANISM
Filed Jan. 14, 1932   3 Sheets-Sheet 1

Inventor
Henry W. Nieman.
By R. S. A. Dougherty
Attorney

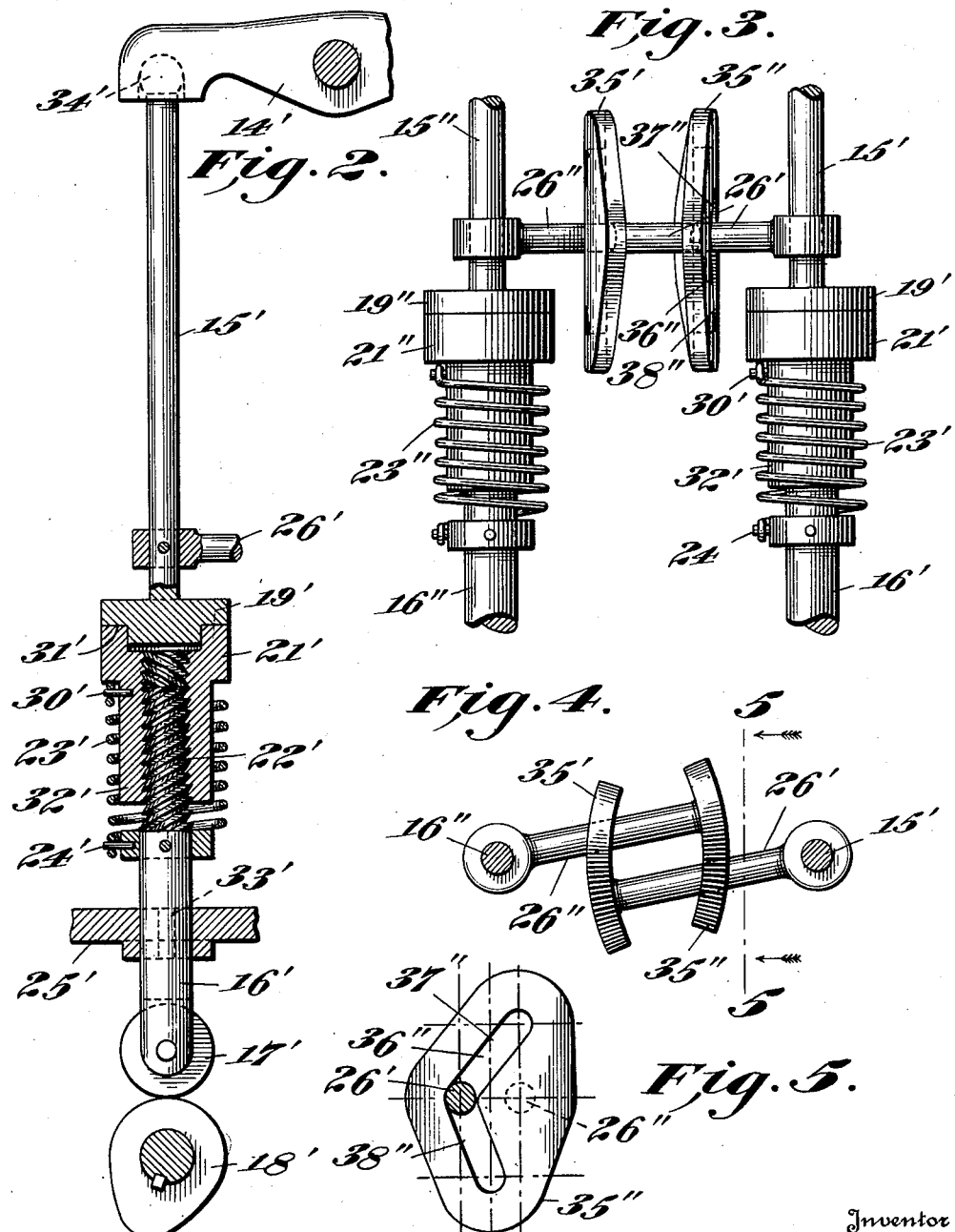

Nov. 5, 1935.  H. W. NIEMAN  2,019,792
ADJUSTING MECHANISM
Filed Jan. 14, 1932   3 Sheets-Sheet 3
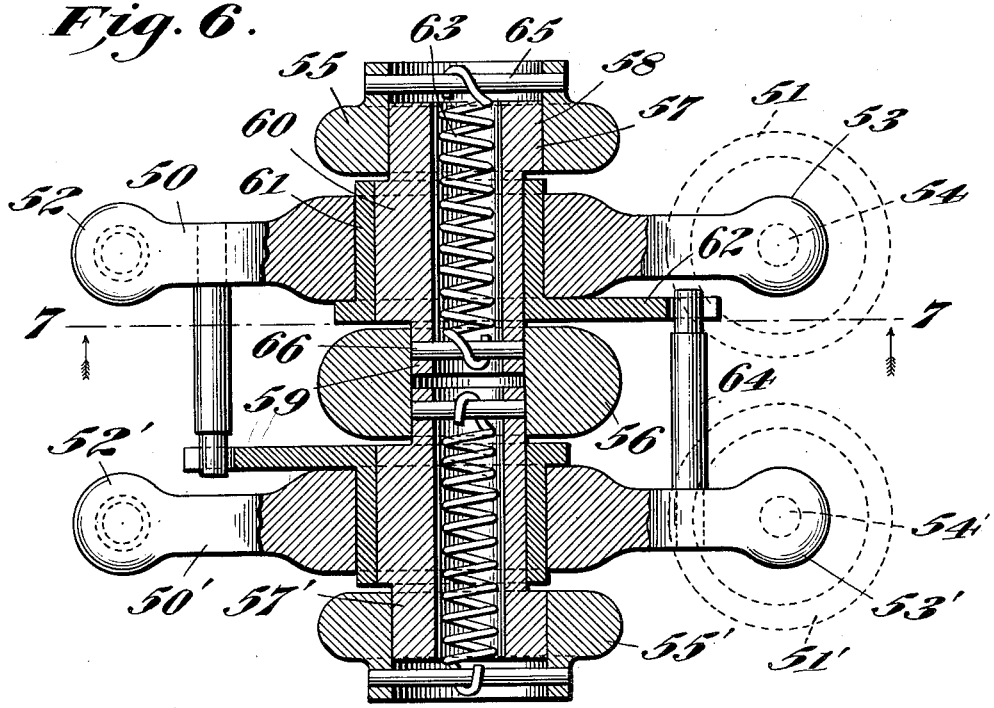
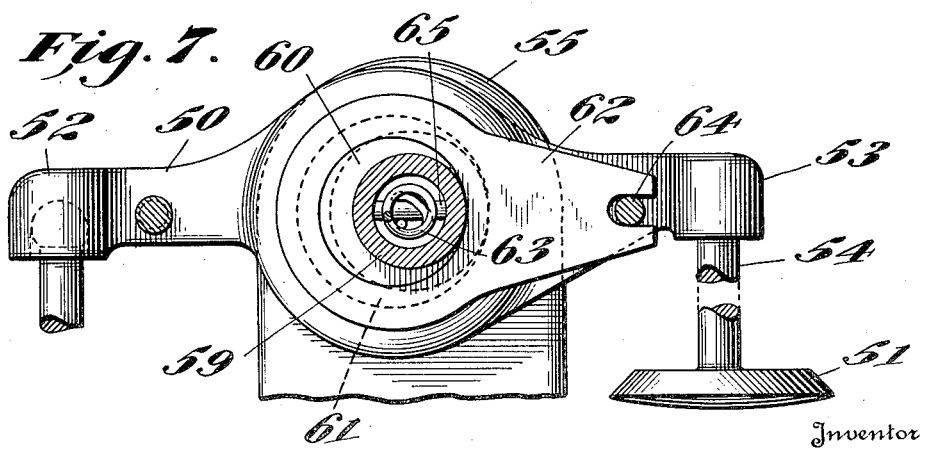
Inventor
Henry W. Nieman.
By R. S. A. Dougherty.
Attorney Patented Nov. 5, 1935

2,019,792

UNITED STATES PATENT OFFICE 2,019,792

ADJUSTING MECHANISM

Henry W. Nieman, Bethlehem, Pa., assignor to Bethlehem Steel Company, a corporation of Pennsylvania Application January 14, 1932, Serial No. 586,551

3 Claims. (Cl. 123—90)

This invention relates to adjusting mechanisms particularly as applied to engine valves. A purpose of the invention is to prevent slackness developing in the parts of an actuating mechanism. When applied to the mechanism operating of the poppet valves of an internal combustion engine, for example, it permits the valve springs to close the valves firmly against their seats while at the same time it automatically prevents any slackness developing in the actuating parts. As is well understood the ordinary cam and roller of a valve actuating mechanism will act quietly and without destructive jar if the parts are accurately adjusted so that the valve is firmly seated when the cam roller is in contact with the circular portion of the cam and no slackness exists in any of the parts.

In the present invention this correct relationship is maintained by adjustments made automatically so that firm closure and quiet operation are alway attained.

The novel features will be more fully understood from the following description and claims taken with the drawings in which:

Fig. 2 is an elevation, partly in section, of a second embodiment of the invention.

Fig. 3 is an elevation of portions of an adjacent pair of units of this second embodiment with interconnecting parts.

Figs. 4 and 5 are details of the mechanism of Fig. 3.

Figs. 6 and 7 are a plan and an elevation, both partly in section, of a third embodiment of the invention.

Figure 1:
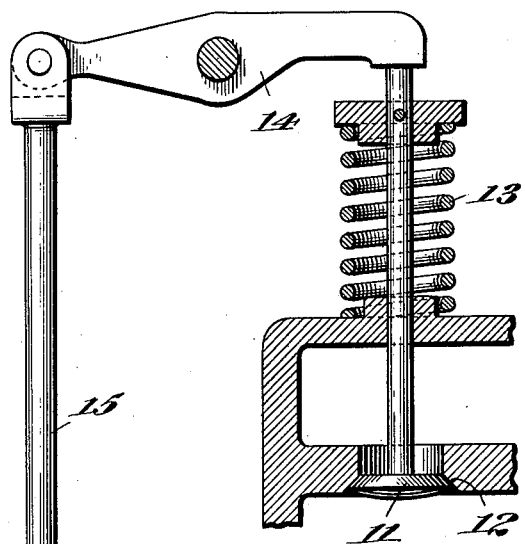
Fig. 1 is an elevation, partly in section, of one embodiment of the invention.

Fig. 1 shows diagrammatically some of the principles involved. Here 11 is a valve held against seat 12 by the pressure of valve spring 13. Rocker arm 14, rods 15 and 16 and roller 17 transmit thrust from cam 18 to the valve for opening the latter. Between rods 15 and 16 is interposed the adjusting mechanism which comprises plate 19, fastened to the end of rod 15 by pivot 20, wedge 21 and palette 22, the latter rigidly fastened to the end of rod 16. Compression spring 23 acting between the thick end of the wedge and arm 24 which is a portion of palette 22 tends to force the wedge forward to increase the space between the plate and palette. This spring is very weak compared with valve spring 13. Elongated bearing 25 guides rod 16 and prevents any sidewise movement thereof. Adjusting link 26 attached to plate 19 by pivot 27 is acted upon at the pivot 28 by external mechanism not here shown and serves to slide the plate back and forth over the face of the wedge.

When cam 18 revolves the raised portion 29 will force roller 17 upward and this motion will be transmitted through the linkage to depress and open valve 11, the wedge being of such acute angle that its friction against the top and bottom members will prevent sliding and cause it to act as a rigid transmission member.

Wedge 21 forced inward by spring 23 prevents play developing in the linkage system at any time and keeps all the actuating parts under a small but definite stress. If, on the other hand, when roller 17 is riding on the circular portion of the cam as shown in the figure, valve 11 is slightly open, the pressure of the valve spring will come on the rocker arm and vertical rod 15 and exert a downward force on plate 19. Under these conditions, if plate 19 is moved to the right or left by link 26, slippage must occur between either the top or bottom surfaces of the wedge. Assuming that the two surfaces of the wedge have the same coefficient of friction, if the plate is moved to the right slippage must occur along the top face of the wedge, since the downward pressure on plate 19 exerts a component to prevent slippage up hill on the sloping face of palette 22. If the movement is to the left slippage will occur along the bottom face of the wedge since the component of the downward pressure on the plate now acts to aid slippage on this plane. As the wedge slips down the plane, the distance between plate and palette is lessened and valve 11 is allowed to seat. After this has been accomplished, further movement of the plate to the left results in slippage along the top plane of the wedge, since there is no longer any downward pressure from the valve spring and the light spring 23 is then sufficient to prevent movement between wedge and palette. If the valve is not seated the net result of a right and left motion of the plate is to shorten the linkage, allow the valve to seat, and leave the system at the end in a condition free from slack. This mechanism, therefore, will act as an automatic adjustment if arrangements are made to impart a slight back and forth motion to plate 19 at frequent intervals during periods when the valve is closed.

Figure 1A:
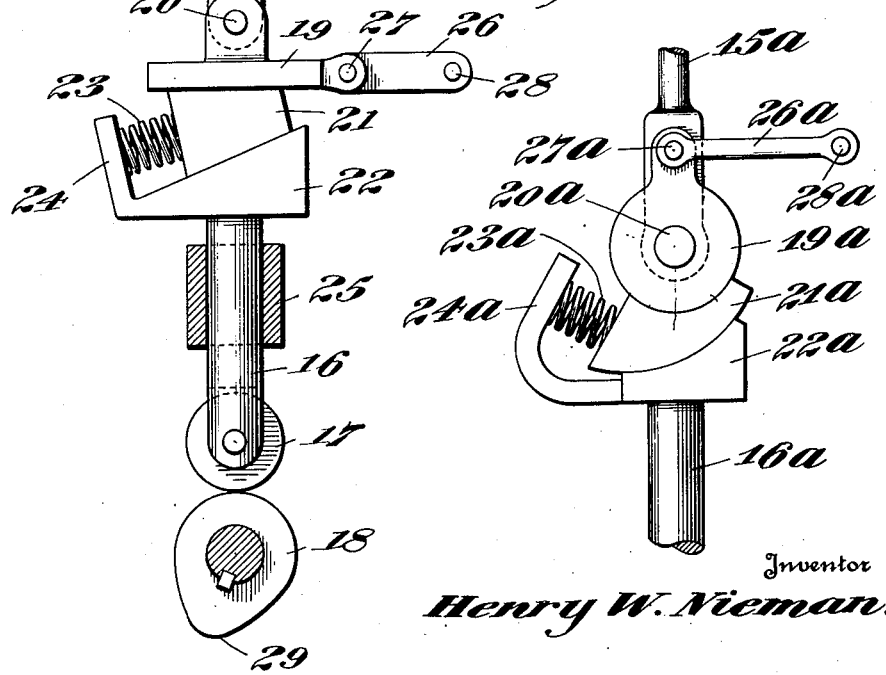
Fig. 1a is a modified detail of the mechanism of Fig. 1.

Fig. 1a represents a modification of the mechanism shown in Fig. 1. Here similar parts are designated by the same numbers as in Fig. 1. In this case rod 15a terminates in pivot 20a upon which is rotatably mounted disk 19a. Circular wedge 2*la* engages with the periphery of this disk and with the cylindrically formed upper surface of palette 22*a* fixed to rod 16*a*. Spring 23*a* acts between arm 24*a* an extension from palette 22*a* and wedge 21*a*. Disk 19*a* is pivoted to link 26*a* at 27*a* so that a right and left motion imparted to the end 28*a* of this link will cause an oscillation of the disk about the pivot 20*a*. It is obvious that this arrangement is equivalent to the straight wedge of Fig. 1 and the action is similar in every respect.

Fig. 2 represents a more compact construction as a substitute for the wedge and associated members of Fig. 1. Here 14' is the rocker arm, 15' and 16' are vertical rods connecting the end of the rocker arm with roller 17' riding on cam 18'. Rod 16' terminates at its upper end in the steep pitch screw 22', engaged by member 21' which comprises the threaded sleeve portion 32' and the annular seat 31'. Rod 15' terminates at its lower end in disk 19' which rests on seat 31' of member 21' and is centered in relation to this latter member by a cylindrical extension on its bottom face. Rod 16' is free to slide vertically in guide 25' but is held from rotation by key 33'. Torsion spring 23' surrounds the sleeve portion of member 21' and is fastened at its end to pegs 30' and 24', the former rigid with member 21', the latter with rod 16', the action of this spring being to exert a torque between members 16' and 21' in such direction as to tend to cause member 21' to travel upwardly on screw 22'. By means of adjusting arm 26' a back and forth rotation may be imparted to rod 15' by external mechanism, the upper end of this rod terminating in a ball 34' to permit such rotation as well as the rocking motion accompanying the opening and closing of the valve.

The action of this mechanism is in every way equivalent to that of Fig. 1, the similarly numbered parts performing in general equivalent functions except that rotations here take the place of translational movements of the wedge parts of Fig. 1. In a direct upward push from the cam roller the mechanism will act as a rigid transmission element, the screw being prevented from backing off by the friction in the threads and between members 21' and 19', it being assumed that at this time arm 26' although free to move upward is held against rotation. At all times a definite amount of tightness in the linkage system and stress in the parts is maintained by spring 23', through its action in twisting and unscrewing sleeve 21'. If on the other hand the pressure of the valve spring is on the system and a slight back and forth movement is imparted to arm 26', member 21 will back off by rotation on the screw. Under these conditions a movement of arm 26' forward (out of the plane of the paper) will cause a slip to take place at the threads, while the opposite movement will cause slippage between members 19' and 21', the net result of a forward and back movement being a recession of member 21' along the screw.

It is obvious that to cause an oscillation of arm 26', or a right and left movement of link 26, during the interval when the valve is closed, suitable connections might be made to almost any moving part of the engine. One method of doing this is shown in Figs. 3–5 in which connections are made between the inlet and outlet valve gears of a single cylinder, so that the movement which causes one of these valves to open and close, simultaneously causes an oscillation of the adjusting arm of the other valve. 16', 19', 21', 23', 15' and 26' are members of the valve gear of one valve, these numbers referring to the same parts as in Fig. 2, while 16'', 19'', 21'', 23'', 15'' and 26'' are the corresponding members of the other of the pair of valves associated with one cylinder of an engine. Adjusting arms 26' and 26'' carry arcuate plates 35' and 35''. These plates are slotted as shown in Fig. 5 with slots of width to permit the passage through them of the opposing adjusting arms. Fig. 4 shows clearly how the arms and plates interlock with each other. From Fig. 5 it will be observed that slot 36'' in plate 35'', which is identical with the corresponding slot in plate 35', consists of two inclined portions 37'' and 38'', the upper portion 37'' making an angle with the vertical axis, shown by the dot and dash line, about twice as great as the angle between the lower portion 38'', and this axis. Fig. 5 represents the relative positions of arms 26' and 26'' when both valves are closed. When the right hand valve is opened arm 26' and plate 35' rise, arm 26' traversing the upper portion of the slot in plate 35'' while arm 26'' traverses the lower portion of the slot in plate 35'. When the left hand valve opens arm 26'' traverses the upper portion of the slot in plate 35' while arm 26' traverses the lower portion of the slot in plate 35''. Now these slots are so cut that the arm of whichever valve opens moves up and down without rotation while the arm of the other valve is rotated through a small angle, in one direction on the upward stroke of the opening valve and back to its initial angular position on the downward stroke, the exact shape of the slots to bring about this result being found in any given case by calculation. A pair of rocker arms and associated mechanisms as shown in Fig. 2 interconnected as shown in Fig. 3 constitutes the complete apparatus for adjusting one pair of valves.

A mechanism working on similar principles but applied in a different location is shown in Fig. 6. Here 50 and 50' are a pair of rocker arms actuating the valves 51 and 51'. The actuating mechanism for the valves comprises cams, cam rollers, and valve rods transmitting the motions from the cam rollers to the ends 52 and 52' of the rocker arms. The opposite ends of these arms 53 and 53' contact with the ends of the valve stems 54 and 54' and depress these to open the respective valves, all of this mechanism being of the conventional type common in internal combustion engines. The pivots of the rocker arms in this case, however, are provided with automatic adjustments for the purposes above described. From the top of the engine frame three projecting lugs 55, 56 and 55' serve as bearings for the rocker arm pivots 57 and 57'. These are identical and a description of one of them with its associated parts will serve for both. Pivot 57 is provided with two cylindrical bearing portions 58 and 59 and with the bearing portion 60, also cylindrical but eccentric to the other two. Bearing portions 58 and 59 are supported by and are free to rotate in apertures of the lugs 55 and 56. Sleeve 61 fits on bearing portion 60 and rocker arm 50 fits on sleeve 61, both of these fits being such as to allow free rotation. Sleeve 61 carries adjusting arm 62 which is slotted and engages with pin 64 projecting from rocker arm 50' from which arrangement it follows that each oscillation of rocker arm 50' causes an equal oscillation of sleeve 61 on bearing portion 60. Pivot 57 is bored to receive spring 63 which exerts a torsional force between pin 65, fixed in lug 55 and pin 64 fixed in pivot 57, this torsional force being in such direction as to tend to cause the bulging side of eccentric 60 to move downward, carrying with it sleeve 61 and rocker arm 50.

With the above described construction it is obvious that at all times a definite amount of tightness in the linkage system and stress in the parts is maintained by the action of spring 63 in rotating pivot 57 and depressing the central bearing of rocker arm 50. The throw of the eccentric 60 is small and the bearing surfaces between the eccentric and sleeve and between the pivot portions 58 and 59 and the inside bearing surfaces in lugs 55 and 56 in which these pivot portions are free to revolve, are so large in diameter that the pivot will be held by friction against the rotational tendency of a direct thrust from the rocker arm. Thus when the rocker arm oscillates due to movements of the cam roller the pivot acts as a rigid member, it being borne in mind that at this time sleeve 61 is prevented from rotation since rocker arm 50' is then at rest. If now a condition arises where the valve does not completely close, the pressure of the valve spring will be on the linkage system after the rocker arm 50 has made its oscillation. Now during the period of rest of this valve, rocker arm 50' makes its stroke to open the other valve, and the oscillation of this rocker arm imparts a like oscillation to sleeve 61. The action of this is to relieve the stress in the system in the same manner as has been described for the other mechanisms. On the opening stroke of valve 51' pin 64 moves downward carrying with it arm 62 and sleeve 61. This causes a slip between this sleeve and rocker arm 50 which is at rest and necessitates also a slip either between the sleeve and the bearing portion 60 or between the bearing portions 58 and 59 and the interior bearing surfaces of lugs 55 and 56 into which these bearing portions fit. Since the pressure of the valve spring on the system exerts a component tending to revolve the eccentric, the pivot will revolve as a whole, the slip occurring between the bearing portions 58 and 59 and their seats. This will either completely or partially relieve the stress in the system due to the valve spring. As valve 51' closes, pin 64 moves upward and slip now occurs between the eccentric and the sleeve, since rotation of the pivot as a whole is now prevented by the component of the upward thrust of the valve spring which is still present or will come into play as soon as the pivot begins to revolve. It is assumed in this reasoning that spring 63 is relatively weak compared with the valve spring, and can only act to revolve the pivot in the absence of more powerful forces.

In such a construction it is important that proper relations be maintained between the pressure of the valve spring and spring 63 and that the diameters of the bearing and eccentric portions of the pivot, and the throw of the eccentric be properly proportioned. The actual friction between parts depends on the materials used and varies in service so that the proper design can only be determined by practical tests for each specific case.

Having thus described my invention, what I claim as new and desire to secure by Letters Patent is:

1. In an engine, a pair of valves, a rod member for each of said valves, adapted to transmit actuating forces for opening said valves, each of said rod members having a friction surface, a wedge member for each of said rod members, having a plurality of friction surfaces, one of said friction surfaces engaging the aforesaid friction surface, a plate member for each of said wedge members having a friction surface engaging another of said friction surfaces of said wedge member forming a common contact surface, each portion of said contact surface being disposed normal to the component of said actuating force transmitted through that portion, and operating connections effective to cause movement of said plate member upon said wedge member of each of said valves upon longitudinal motion of the rod member of the other of said valves.

2. In an engine, a pair of valves, a rod member for each of said valves, adapted to transmit longitudinal motions, each of said rod members having a threaded portion, a sleeve member engaging each of said threaded portions, each of said sleeve members having a friction surface, a plate member for each of said sleeve members having a friction surface engaging the aforesaid friction surface of said sleeve member forming a common contact surface, each portion of said contact surface being disposed normal to the component of said actuating force transmitted through that portion and operating connections effective to cause rotation of the said plate member of each of said valves upon longitudinal motion of the rod member of the other of said valves.

3. In a valve operating mechanism, a series of members for transmitting an actuating force for opening said valve, including a plate member, a sleeve member rotatably engaging said plate member along a first bearing surface, each portion of said surface being disposed normal to the component of said actuating force transmitted through that portion, a threaded member rotatably engaging said sleeve member along a helical bearing surface, resilient means acting on said sleeve member to resist the rotational tendency caused by the transmission of the actuating force through said helical bearing surface, and means for causing a rotary oscillation of said plate member during periods when the valve is closed.

HENRY W. NIEMAN.